United States Patent [19]

Raz

[11] 4,403,669
[45] Sep. 13, 1983

[54] APPARATUS FOR WEIGHING CONTINUOUSLY-MOVING ARTICLES PARTICULARLY USEFUL FOR GRADING PRODUCE

[75] Inventor: Omri Raz, Hagalil Hamaaravi, Israel

[73] Assignee: Eshet Eilon, Hagalil Hamaaravi, Israel

[21] Appl. No.: 340,275

[22] Filed: Jan. 18, 1982

[51] Int. Cl.³ .................... G01G 19/00; G01G 21/22; B07C 5/16
[52] U.S. Cl. .................................. 177/145; 177/262; 209/645; 209/592
[58] Field of Search ............... 177/145, 262; 209/592, 209/594, 645, 649

[56] References Cited

U.S. PATENT DOCUMENTS 2,597,069  5/1952  Conti ............................ 177/145 X
4,106,628  8/1978  Warkentin et al. ............ 177/145 X
4,254,877  3/1981  Rose ................................. 209/594

Primary Examiner—George H. Miller, Jr.
Attorney, Agent, or Firm—Benjamin J. Barish

[57] ABSTRACT

Apparatus for weighing continuously moving articles, and particularly useful for grading produce, comprises a plurality of parallel lines of trays for receiving the articles to be weighed, a weighing device at a weighing station in each line, and drive means for moving the trays in each line one-at-a-time longitudinally across the weighing device in its line. Each weighing device comprises two pairs of rails; one pair at each of its two opposite ends; and each tray comprises two rods extending transversely across the tray, one rod at each of its two opposite ends, engageable with the two weighing device rails, the arrangement being such that each tray is supported by its two rods engaging the two pairs of weighing device rails for a substantial portion of the movement of the tray across the weighing device in its respective line.

10 Claims, 4 Drawing Figures

APPARATUS FOR WEIGHING CONTINUOUSLY-MOVING ARTICLES PARTICULARLY USEFUL FOR GRADING PRODUCE

BACKGROUND OF THE INVENTION

The present invention relates to apparatus for weighing continuously-moving articles. The invention is particularly useful in apparatus for grading produce, such as avocados, pears, mangoes, peppers, apples, etc. and is therefore described below with respect to such an application.

Many articles of produce are now graded or classified according to weight, either because the classification is based on weight, or because the classification is based on size and there is a correlation between size and weight with respect to that particular article. One known form of grader apparatus includes a plurality of parallel lines of trays for receiving the articles to be weighed, a weighing device at a weighing station in each line, and drive means for moving the trays in each line one-at-a-time longitudinally across the weighing device in its line. The actual weighing is usually done electrically or electronically, e.g., by a load cell. In some of the known grading apparatus, however, the accuracy of the weight measurement may be affected by the position of the article within the tray; for example, in the case of long articles such as avocadoes or cucumbers, the center of gravity of the article being weighed may be sufficiently off-center so as to apply a rotary moment to the tray, such that the tray drive, or its coupling to the tray drive, may act to partially support or load the tray, which would result in the measured weight being greater or less than the true weight of the article. In other known grader apparatus, the tray, including the article to be weighed, is supported on the weighing device only for a relatively small part of the movement of the tray across the weighing device, so that the apparatus must be driven at a relatively slow speed to provide the electrical or electronic weighing device sufficient time to accurately weigh each tray and to normalize between weighing to avoid the accummulation of errors.

BRIEF SUMMARY OF THE INVENTION

An object of the present invention is to provide apparatus for weighing continuously-moving articles, and particularly article grading apparatus, having advantages in both of the above respects.

According to a broad aspect of the present invention, the apparatus includes a weighing device having a first pair of rails at one end thereof extending parallel to and on opposite sides of its longitudinal axis, and a second pair of rails at the opposite end thereof extending parallel to and on opposite sides of its longitudinal axis. In addition, the apparatus includes a plurality of trays each having a first pair of contact points adjacent to the leading end of the tray on opposite sides of its longitudinal axis engageable with one pair of rails during at least a portion of the movement of the tray across the weighing device, and a second pair of contact points adjacent to the trailing end of the tray on opposite sides of its longitudinal axis engageable with the other pair of rails substantially concomittently with the engagement of the first pair of rails by the first pair of contact points. The arrangement is such that each tray is supported by the two pairs of contact points engaging the two pairs of weighing device rails for a substantial portion of the movement of the tray across the weighing device.

In the preferred embodiment of the invention described below, the two pairs of contact points of each tray are constituted by two rods extending transversely across the tray, one at its leading end and the other at its trailing end, which rods are engageable by the two pairs of the weighing device rails. The two pairs of rails are located at different elevations at the upper part of the weighing device, and the rods are located at correspondingly different elevations at the lower part of each tray, such that the tray is supported in a substantially horizontal position as it is moved across the weighing device.

The described apparatus further includes two pairs of conveyor rails at the opposite ends of the weighing device, each of the latter pairs of rails being engageable by one of the two rods on the tray when moving towards and away from the weighing device. The conveyor rails are interrupted at the weighing device and have cam surfaces at the interruptions effective to lower the tray onto the weighing device such that the two rods of the tray substantially simultaneously engage the two pairs of weighing device rails, and then to raise the tray, after traversing the weighing device, such that the two tray rods substantially simultaneously disengage from the two pairs of weighing device rails.

In the described preferred embodiment, the drive means comprise pull-bars received in openings in the leading end of the trays forwardly of their leading-end rods, which pull-bars pull each tray across the top of its weighing device without applying any support or load to the tray.

It has been found that such an arrangement not only assures that the weight of the tray and article carried thereon will always be accurately weighed by the weighing device, but also assures that the tray will be supported solely by the weighing device for a substantial portion of the movement of the tray across the weighing device, thereby providing sufficient time for the weighing device to register the weight of each tray and to normalize between weighings, even when the apparatus is operating at relatively high speeds.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
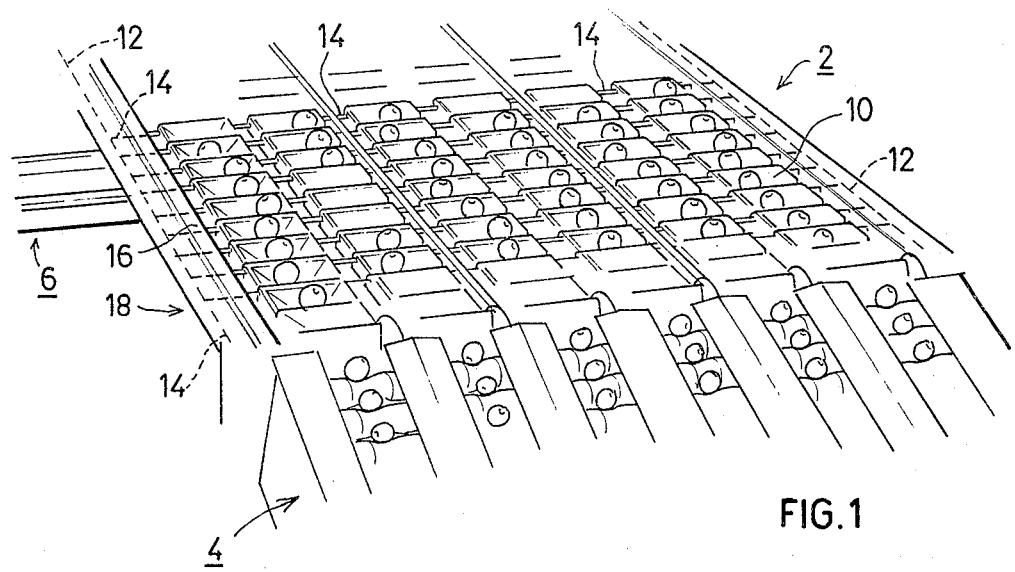
FIG. 1 is a three-dimensional view illustrating a part of a grader apparatus constructed in accordance with the present invention.

The apparatus illustrated in FIG. 1 of the drawings is particularly useful in grading produce, such as avocados, pears, apples, etc., according to weight. The illustrated apparatus includes three main sections, namely: a grader section, generally designated 2, in which the grading according to weight is done; a feeder section, generally designated 4, for feeding the articles to the grader section 2; and an outlet section 6 including a plurality of conveyor lines which convey the weight-graded articles to packaging apparatus or to other grading apparatus for further grading, e.g., according to outer appearance or color. The present invention is concerned primarily with the grader section 2 in which the articles are graded according to weight, and therefore the remainder of the description will be substantially restricted to this section.

The grader section 2 includes a plurality of parallel lines of trays or cups 10 each adapted to receive, from the feeder section 4, one of the articles (e.g., apples) to be weighed. In the illustrated apparatus, there are six lines of cups all moved by a common drive, e.g., by an endless chain schematically shown by broken lines 12 in FIG. 1 on opposite sides of the six lines of cups. The drive further includes a plurality of pull-bars 14 for pulling the trays, as illustrated in FIG. 1 and more particularly illustrated in FIG. 4. Each of the pull-bars 14 is coupled at its opposite ends to the drive chains 12 and passes through openings in one of the trays in each of the six lines, so that all six lines of trays are driven together by the drive chains 12.

Figure 2:
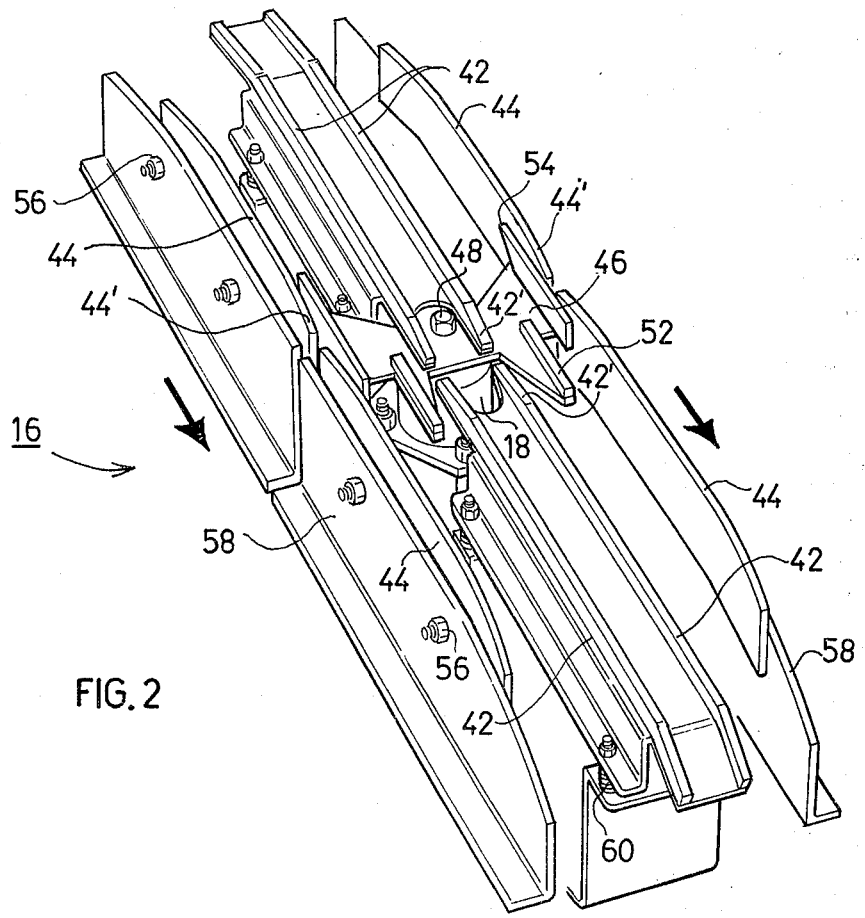
FIG. 2 is a three-dimensional view illustrating one weighing station in the grader apparatus of FIG. 1.

Each of the six lines of trays 10 includes a weighing station for weighing the tray and its contents in the respective line. One such weighing station, generally designated 16, is illustrated in FIGS. 2 and 4, wherein it will be seen that it includes a weighing device 18 adapted to support each tray as it is moved thereacross by its pull-bar 14. Each tray includes a bottom structure, shown particularly in FIG. 3, which is co-operable with the weighing device 18 at the weighing station 16.

Figure 3:
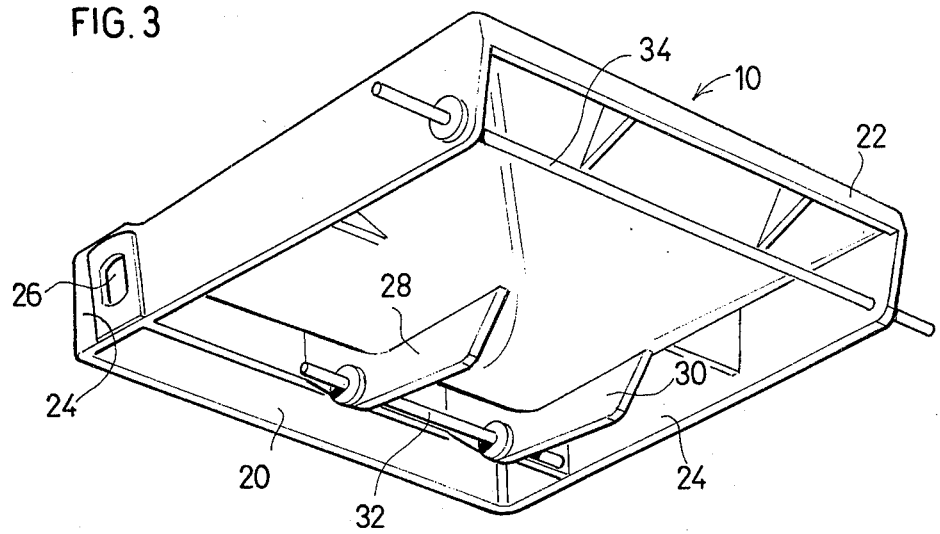
FIG. 3 is a three-dimensional view illustrating the bottom construction of each of the trays in the apparatus of FIGS. 1 and 2.
Figure 4:
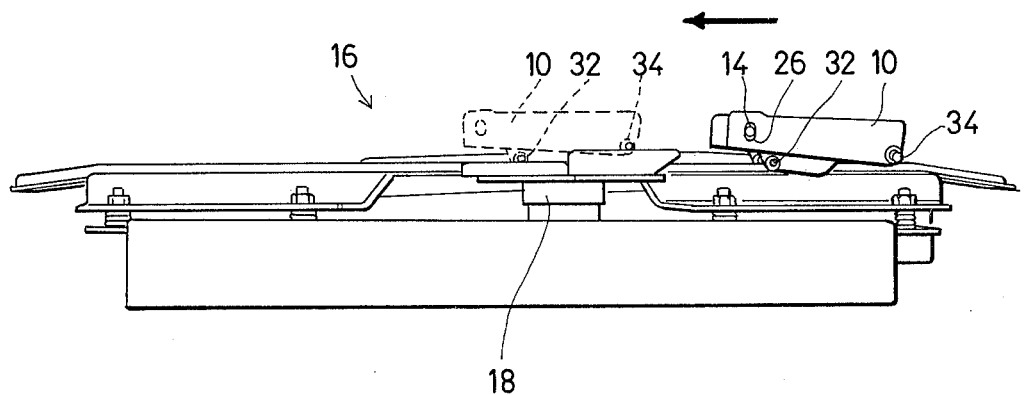
FIG. 4 is a side elevational view illustrating the movement of a tray across the weighing device in the apparatus of FIGS. 1 and 2.

Thus, as shown in FIG. 3, each tray 10 is of substantially rectangular configuration with its top face dished for receiving one of the articles to be graded. The tray is formed with four depending walls, including a front wall 20 at its leading end, a rear wall 22 at its trailing end, and a pair of side walls 24. The side walls 24 are formed with aligned openings 26 adjacent to the leading end of the tray, which openings are adapted to receive a pull-bar 14 of the drive mechanism for pulling the tray across the top of the weighing device 18 at the weighing station 16 in the respective line of the grader section 2. Openings 26 formed through the side walls 24 of the tray are of substantially larger diameter than the pull-bars 14, so that the pull-bars have ample room for movement within the openings since they are to apply only a longitudinal pulling force to the respective tray, and no vertical force which may tend to partially support or partially load the tray as it is pulled across the weighing device. Thus, the true weight of the tray, including its contents, will be registered by the weighing device.

The bottom of each tray 10 is further formed with a pair of ribs 28, 30 extending parallel to the longitudinal axis of the tray just rearwardly of its front wall 20 at the leading end of the tray. These ribs 28, 30 project from the bottom of the tray and are used to support a short transversely-extending rod 32 also projecting from the bottom of the tray. A second, transversely-extending rod 34 is mounted across the side walls 24 of the tray at its trailing end just under its rear wall 22, the latter wall being undercut to accommodate rod 34. As can be seen from FIG. 3, rod 32 adjacent to the leading end of the tray is of shorter length than, and is mounted below, rod 34 at the trailing end.

Rods 32 and 34 at the bottom of each tray 10 are used for supporting each tray as it is pulled by its pull-bar 14 into and out of the weighing station 16 of its respective line to permit the weighing device 18 at the weighing station to weigh the tray and its contents. For this purpose, the conveyor of the grader section 2 includes a pair of inner rails 42 cooperable with the leading-end rod 32 of each tray 10, and a pair of outer rails 44 cooperable with the trailing-end rod 34 of each tray. The leading-end rod 32 thus provides two contact points engageable with the inner pair of rails 42, and the trailing-end rod 34 thus provides two contact points engageable with the outer pair of rails 44. The inner pair of rails 42 are of lower elevation than the outer pair 44, to conform to the different elevations of rods 32 and 34, so that each tray is supported in a substantially horizontal position by the engagement of rods 32 and 34 with rails 42 and 44, respectively.

As shown particularly in FIG. 2, the pair of inner rails 42 overlie, but are spaced slightly above, a platform 46 secured, as by fastener 48, to the upper end of the weighing device 18. The inner rails 42 include an interruption at the end of the platform 46 and then continue on at the other side of the platform. The interrupted ends of the inner rails 42 are downwardly tapered, as shown at 42', to provide cam surfaces for a reason to be explained below. The pair of outer rails 44 are similarly interrupted at the weighing device platform 46 and are similarly formed with downwardly-tapered cam surfaces, as shown at 44', at their interruptions.

The weighing device platform 46 also includes two pairs of rails. Thus, a pair of inner rails 52 are carried on a front extension of platform 46 so as to bridge the interrupted ends 42' of the inner rails 42; and a pair of outer rails 54 are carried on a rear extension of platform 46 so as to bridge the interrupted ends 44' of the outer rails 44. The inner rails 52 on the weighing platform 46 are slightly below the inner rails 42 of the tray conveyor, and the outer rails 54 on platform 46 are slightly below the outer rails 44, it being recalled that the outer rails 44 are higher than the inner rails 42.

The outer rails 44 are secured, as by fasteners 56, to a pair of side walls 58 whose top edges are below the tops of the outer rails 44; and the inner rails 42 are secured, as by bolts 60, so as to extend at the appropriate elevation below the tops of rails 44.

The illustrated apparatus operates as follows:

With reference first to FIG. 1, it will be seen that the feeder section 4 of the apparatus feeds the articles (e.g., apples) to be graded according to weight, so that each of the trays 10, in the illustrated six lines of trays, receives one of the articles. The six lines of trays are pulled by the pull-bars 14 driven by the drive chains 12 so as to convey each tray, one at a time, to the weighing station 16 in its respective line. At the weighing station, each tray is weighed by the weighing device 18, and the registered weight is used to control gates (not shown) for directing each article to the respective conveyor in the outlet section 6 according to the weight of the article.

More particularly, each tray 10 is pulled by its pull-bar 14 along the conveyor rails 42 and 44 to and across the weighing device 18 in the direction of the arrows in FIGS. 2 and 4, the latter illustrating the tray 10 in full lines when approaching the weighing device 18, and in broken lines when located on the weighing device. Each tray is pulled along rails 42 and 44 with the leading-end rod 32 of the tray providing two contact points engaging the inner conveyor rails 42, and the trailing-end rod 34 of the tray providing two contact points engaging the pair of outer conveyor rails 44. Rod 32 of the tray thus rides along the upper faces of rails 42 until it reaches cam surfaces 42' at their interrupted ends, at which time the rod 32 is lowered to engage the pair of inner rails 52 carried at the upper end of the weighing device platform 46 bridging the interruption in the conveyor inner rails 42. Similarly, tray rod 34 rides along the upper faces of the outer conveyor rails 44 until it reaches cam surfaces 44' at their interrupted ends, at which time the rod is lowered to engage the upper face of the outer rails 54 on the weighing device platform 46 bridging these interruptions.

The spacings of the interruptions in the inner rails 42 and in the outer rails 44 and thereby of the bridging rails 52 and 54 on the weighing device 18, are such that the engagement of rod 32 on, and its disengagement from, the inner weighing device rails 52 are substantially concommittent with the engagement and disengagement of rod 34 with respect to the outer weighing device rails 54. That is, the cam surfaces 42' and 44' at the interrupted ends of the conveyor rails 42 and 44, first lower the tray 10 onto the weighing device 18 such that the two rods 32, 34 of each tray substantially simultaneously engage the two pairs of weighing device rails 52, 54, and then, after the tray has traversed the weighing device, raise the tray such that the two tray rods 32, 34 substantially simultaneously disengage from the two pairs of weighing device rails 52, 54.

It will thus be seen that the weighing device 18 supports the tray 10 for a substantial portion of the movement of the tray across the weighing device. The illustrated apparatus thereby provides sufficient time, even when operated at high speed, to accurately register the weight of the tray and its contents and also to normalize between tray-weighings in order to prevent the accumulation of errors. It will also be seen that the trays are moved across their respective weighing devices 18 by the pull-bars 14 such that the pull-bars apply only a longitudinal pulling force to each tray; i.e., no vertical force is applied to the tray which may tend to partially support or partially load the tray as it is pulled across the weighing device, thereby assuring that the weighing device 18 will register the true weight of each tray and its contents.

While the invention has been described with respect to one preferred embodiment, it will be appreciated that many variations, modifications and applications of the invention may be made.

What is claimed is:

1. Apparatus for weighing continuously moving articles, comprising a plurality of trays for receiving the articles to be weighed, a weighing device, and drive means for moving said trays one-at-a-time longitudinally across said weighing device, characterized:

in that said weighing device comprises a first pair of rails at one end thereof extending parallel to and on opposite sides of its longitudinal axis, and a second pair of rails at the opposite end thereof extending parallel to and on opposite sides of its longitudinal axis;

and in that each of said trays comprises a first pair of contact points adjacent to the leading end thereof on opposite sides of its longitudinal axis engageable with one pair of rails during at least a portion of the movement of the tray across the weighing device, and a second pair of contact points adjacent to the trailing end thereof on opposite sides of its longitudinal axis engageable with the other pair of rails substantially concommittently with the engagement of the first pair of rails by said first pair of contact points, such that said tray is supported by said two pairs of contact points engaging said two pairs of rails for a substantial portion of the movement of each tray across said weighing device.

2. Apparatus according to claim 1, wherein said two pairs of contact points are constituted of two rods, one rod extending transversely across said tray adjacent to its leading end and its trailing end, which rods are engageable by said two pairs of rails.

3. Apparatus according to claim 2, wherein said two pairs of rails are located at different elevations at the upper part of said weighing device, and said two rods are located at correspondingly different elevations at the lower part of each of said trays such that the tray is supported in a substantially horizontal position as it is moved across the weighing device.

4. Apparatus according to claim 3, wherein said apparatus further includes two pairs of conveyor rails which are interrupted at said weighing device, each of said latter pairs of rails being engageable by one of said two rods when the respective tray is moving towards and away from said weighing device.

5. Apparatus according to claim 4, wherein said conveyor rails have cam surfaces at their interruptions effective first to lower the respective tray onto the weighing device such that the two rods of the tray substantially simultaneously engage the two pairs of weighing device rails, and then to raise the tray so as to substantially simultaneously cause the two rods to disengage from the weighing device rails.

6. Apparatus according to claim 5, wherein said weighing device rails are carried on a horizontal platform secured to said weighing device.

7. Apparatus according to claim 6, wherein said weighing device rails are secured to said platform to bridge the cam surfaces at the ends of the conveyor rails.

8. Apparatus according to claim 7, wherein said rod on the leading end of each tray is of smaller length and lower elevation than the rod on the trailing end of the tray.

9. Apparatus according to claim 1, wherein said drive means comprises a pull-bar received in the leading end of each tray forwardly of the leading-end contact points of the tray for pulling the tray across the top of the weighing device without applying any support or load to the tray.

10. Apparatus according to claim 9, wherein there are a plurality of parallel lines of trays, each line including a weighing device, said drive means including a plurality of pull-bars each extending transversely across the lines of trays and received in aligned openings of one tray in each line.

* * * * *